(12) United States Patent
Kovach

(10) Patent No.: US 8,335,491 B1
(45) Date of Patent: Dec. 18, 2012

(54) MOBILUX SYSTEM UTILIZING CAMERA-EQUIPPED CELLULAR TELEPHONES FOR ANTI-COUNTERFEIT AUTHENTICATION

(76) Inventor: Aram Kovach, Lewis Center, OH (US)

( * ) Notice: Subject to any disclaimer, the term of this patent is extended or adjusted under 35 U.S.C. 154(b) by 136 days.

(21) Appl. No.: 13/013,549

(22) Filed: Jan. 25, 2011

Related U.S. Application Data

(60) Provisional application No. 61/298,197, filed on Jan. 25, 2010.

(51) Int. Cl.
*H04M 1/66* (2006.01)

(52) U.S. Cl. ........ 455/411; 455/410; 235/383; 235/385; 235/454; 235/426.01; 705/317; 705/318

(58) Field of Classification Search ................. 455/3.06, 455/410, 411, 556.1; 705/317, 318; 235/385, 235/383, 454, 426.01
See application file for complete search history.

(56) References Cited

U.S. PATENT DOCUMENTS

| | | | | |
|---|---|---|---|---|
| 6,823,075 B2 * | 11/2004 | Perry | ............................ | 382/100 |
| 7,079,230 B1 * | 7/2006 | McInerney et al. | ............. | 356/71 |
| 7,222,791 B2 * | 5/2007 | Heilper et al. | ........... | 235/462.01 |
| 7,280,669 B2 * | 10/2007 | Choi et al. | ..................... | 382/100 |
| 7,516,899 B2 * | 4/2009 | Laser | ............................. | 235/468 |
| 7,571,856 B2 * | 8/2009 | Lo | ............................. | 235/462.01 |
| 7,810,726 B2 * | 10/2010 | de la Huerga | ................. | 235/385 |
| 2002/0158137 A1 * | 10/2002 | Grey et al. | ..................... | 235/494 |
| 2005/0108044 A1 * | 5/2005 | Koster | ............................. | 705/2 |
| 2005/0137882 A1 * | 6/2005 | Cameron et al. | .................. | 705/1 |
| 2007/0228166 A1 * | 10/2007 | Lui | ............................. | 235/454 |
| 2007/0291988 A1 * | 12/2007 | Karimov et al. | .............. | 382/103 |
| 2008/0128496 A1 * | 6/2008 | Bertranou et al. | ............ | 235/383 |
| 2009/0124195 A1 * | 5/2009 | Kamijoh et al. | ............. | 455/3.06 |

* cited by examiner

*Primary Examiner* — Olumide T Ajibade Akonai
(74) *Attorney, Agent, or Firm* — James R. Eley; Michael A. Forhan; Eley Law Firm Co., LPA

(57) ABSTRACT

A system for verifying the authenticity of an item. At least one cellular telephone has an image recorder, a receiver and a transmitter. A cellular telephone network receives a recorded image transmitted by the cellular telephone and forwards the recorded image to at least one remote server. An image-recognition device is accessible to the remote server, the image recognition device being configured to decode a latent image embedded within the recorded image and to generate a dataset corresponding to the latent image. A processor accessible to the remote server generates a response corresponding to the dataset and indicating the authenticity status of the item, the response being forwarded from the remote server to the receiver of the cellular telephone by means of the cellular telephone network.

14 Claims, 5 Drawing Sheets

MOBILUX SYSTEM UTILIZING CAMERA-EQUIPPED CELLULAR TELEPHONES FOR ANTI-COUNTERFEIT AUTHENTICATION

This application claims priority to U.S. provisional patent application No. 61/298,197, filed Jan. 25, 2010, the entire contents of which are hereby incorporated by reference.

FIELD

The present invention relates generally to cellular telephones, in particular to a system that utilizes camera-equipped cellular telephones to send images recorded by the cellular telephone and to receive stored information corresponding to the images.

BACKGROUND

Camera-equipped cellular telephones have become commonplace. However, the image-capturing capability of these cellular telephones is typically utilized merely to record images and share them with others. There is a need for a way to utilize the image-capturing capability of camera-equipped cellular telephones to serve as a data input device. There is a further need for a way to utilize data relating to the captured image to provide information and services, particularly to avoid purchasing counterfeit goods.

SUMMARY

A system utilizing camera-equipped cellular telephones for anti-counterfeit authentication is disclosed according to an embodiment of the present invention. Products to be protected by the present invention are tagged with identifiers that are invisible to the naked eye and comprise a unique set of random codes. To check the product to determine whether it is genuine or counterfeit a user captures a still or video electronic image of the tag on the product with a cellular telephone and sends the image to a service provider as a photographic message. The service provider decodes the image of the tag in the message, then compares the decoded image to reference data stored in a database maintained by the service provider. The service provider determines, from the comparison, whether the product is genuine or counterfeit and notifies the user accordingly.

An aspect of the present invention is a system for verifying the authenticity of an item. At least one cellular telephone has an image recorder, a receiver and a transmitter. A cellular telephone network receives a recorded image transmitted by the cellular telephone and forwards the recorded image to at least one remote server. An image-recognition device is accessible to the remote server, the image recognition device being configured to decode a latent image embedded within the recorded image and to generate a dataset corresponding to the latent image. A processor accessible to the remote server generates a response corresponding to the dataset and indicating the authenticity status of the item, the response being forwarded from the remote server to the receiver of the cellular telephone by means of the cellular telephone network.

Another aspect of the present invention is a method for verifying the authenticity of an item. The method includes the steps of recording an image associated with the item with a camera-equipped cellular telephone and utilizing a cellular telephone network to forward the recorded image to at least one remote server. The remote server decodes a latent image embedded within the recorded image and generates a dataset corresponding to the latent image. The authenticity of the item is determined from the dataset. A response is sent from the remote server to the cellular telephone by means of the cellular network, the response comprising information relating to the authenticity of the item.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
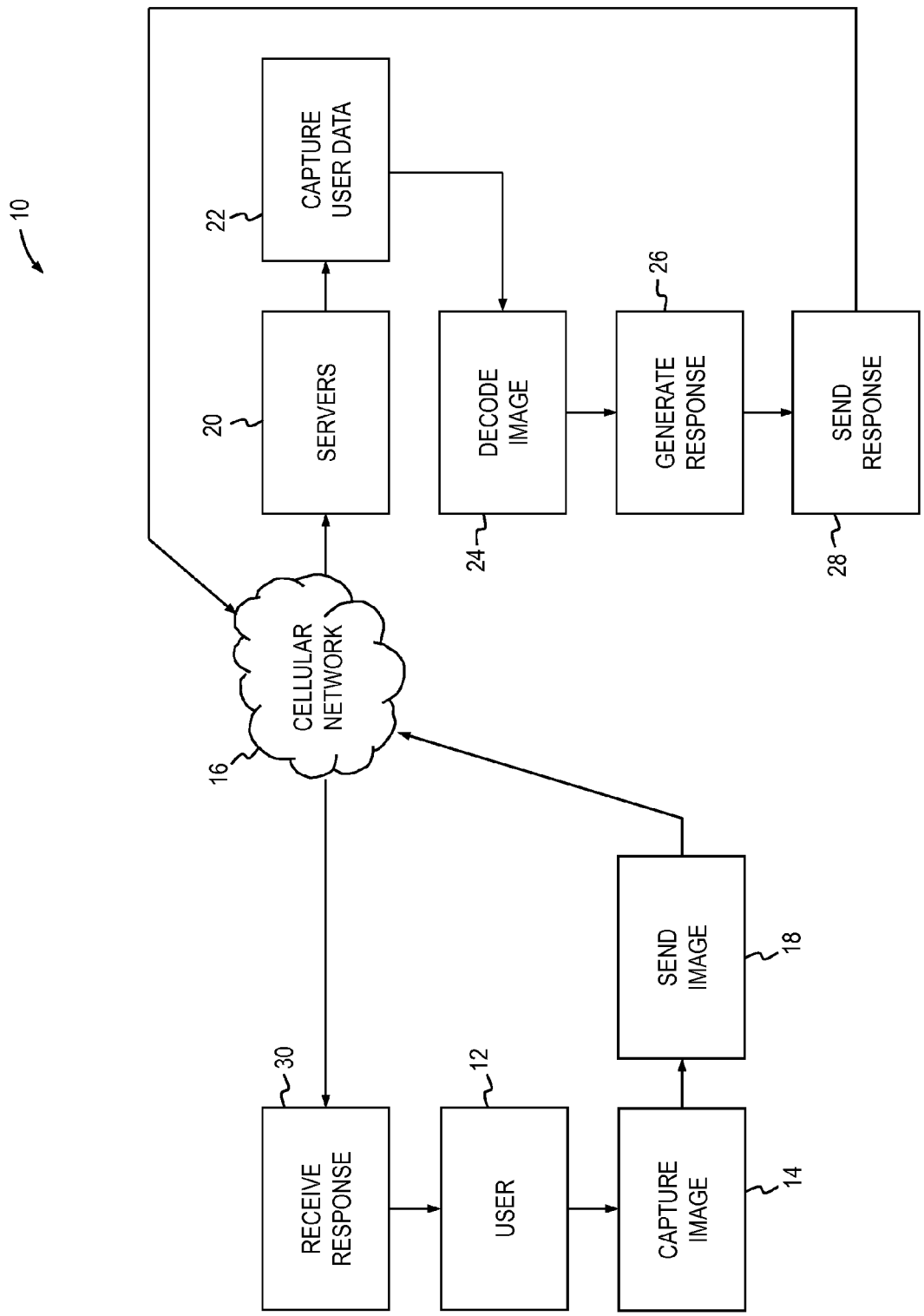
FIG. 1 is a diagram of a system utilizing a camera-equipped cellular telephone according to an embodiment of the present invention.

The general arrangement of a commerce system 10 (hereafter "system 10") utilizing camera-equipped cellular telephones is shown in FIG. 1 according to an embodiment of the present invention. A user 12 records a still or video image of interest 14 with a camera-equipped cellular telephone and utilizes a cellular telephone network 16 to transmit at 18 the recorded image to one or more remote servers 20 maintained by an operator of system 10. User 12 data, such as the cellular telephone number, name, address and demographic information relating to the user, may be captured at 22 and stored in a database or data warehouse for later use. The received image is decoded at 24 with image-recognition equipment and/or software to generate a corresponding dataset. The dataset is processed at 26 in a predetermined manner 26 to generate a response corresponding to the dataset. At 28 the response is sent to user 12 via cellular network 16. User 12 receives the response at 30 and may utilize the response as desired.

Products to be protected by the present invention are tagged or are otherwise marked with identifiers comprising a unique set of random codes and "watermarks," either or both of which may or may not be visually perceivable. To check the product to determine whether it is genuine or counterfeit a user captures an image of the tag on the product and sends the image to a service provider as a photographic message. The service provider compares the image of the tag in the message to reference data stored in a database maintained by the service provider. The service provider determines, from the comparison, whether the product is genuine or counterfeit. If the product is genuine the service provider sends a certificate of authenticity to the sender of the image in the form of a validation certification code, which may include identifying information about the product and/or visually perceivable data on the tag that the user may compare to the certification code. If the product is counterfeit the service may warn the user accordingly.

Figure 2:
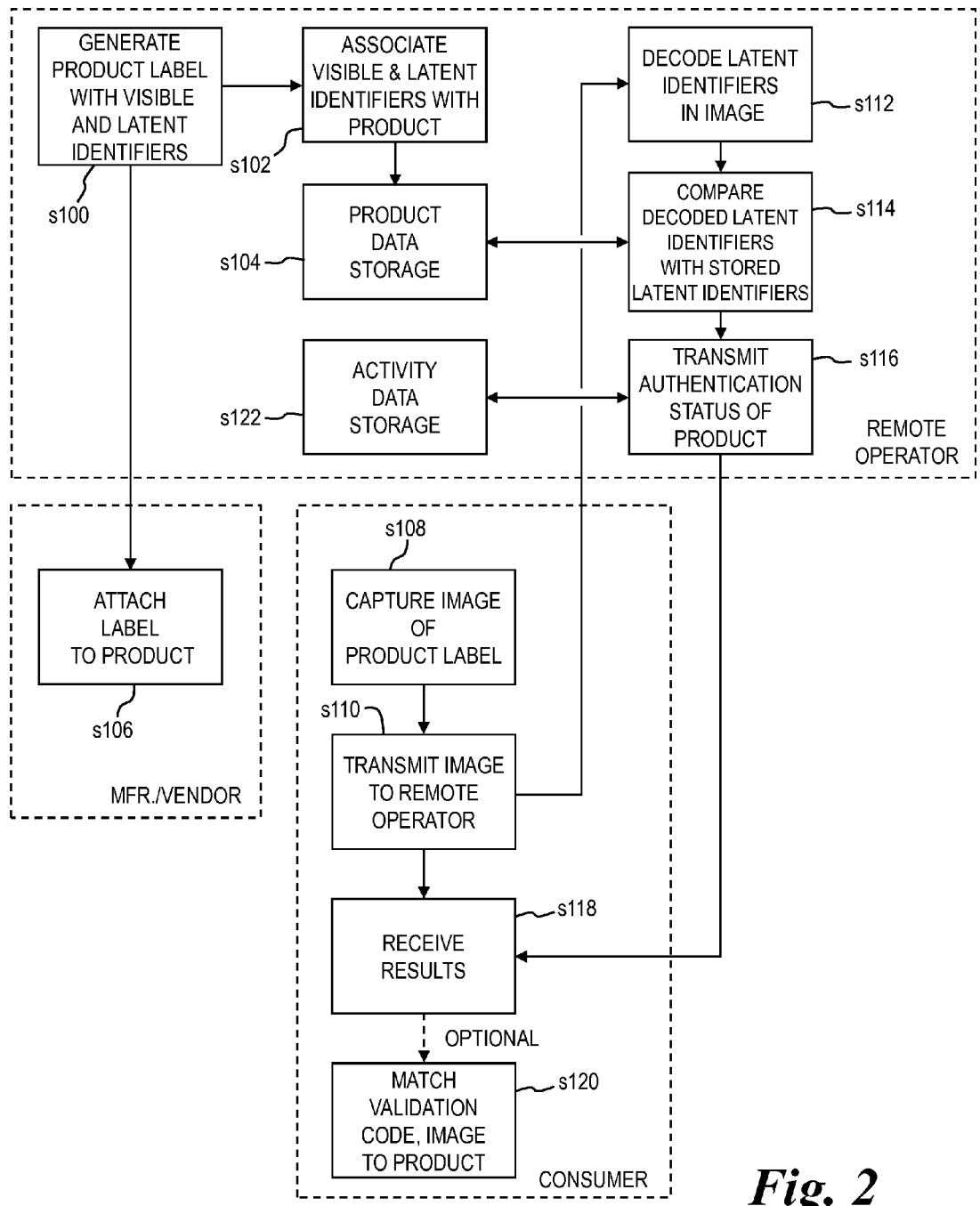
FIG. 2 shows the general arrangement of a system utilizing camera-equipped cellular telephones for anti-counterfeit authentication according to an embodiment of the present invention.
Figure 3:
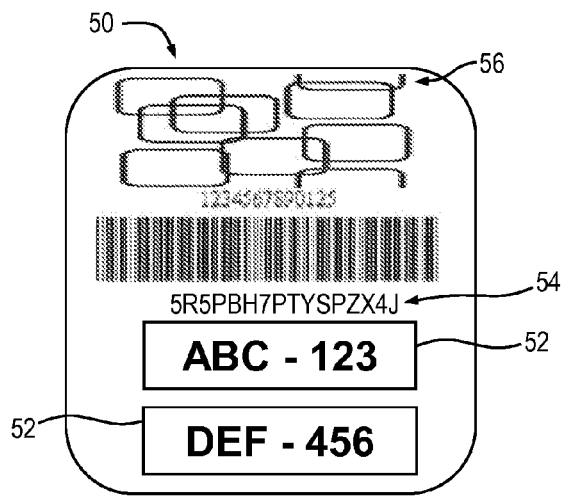
FIG. 3 shows a label that may be associated with a product according to an embodiment of the present invention.

Details of the operation of system 10 according to an embodiment of the present invention are shown in FIG. 2. At s100 product labels or tags, such as a product label or tag 50 (hereafter generally "label"), shown in FIG. 3, are produced by (or at the behest of) a "remote server" or, interchangeably a "remote operator" using any suitable process, such as printing using black-and-white, gray-scale or color ink. The product labels 50 each preferably include "latent identifiers," that is, identifying characteristics that are not visually perceivable.

Product labels 50 may also include visually perceivable identifiers 52, such as alphanumeric characters and/or a non-alphanumeric symbol or symbols. In alpha-numeric form, visually perceivable identifiers 52 are photographable or, alternatively, may be sent in a "Short Message Service" (SMS), MMS (multimedia service) or similar text message. It should be noted that labels 50 may be produced such that each label has a unique set of identifiers 52, each label being associated with a single determinable item. Identifiers 52 may be configured in a random or other non-sequential manner between labels 50, thereby deterring counterfeiting by copying a known-authentic label.

At s102, the latent identifiers and the visually perceivable identifiers 52 of label 50 are associated with a particular item or product (hereafter generally "product") by the remote operator, information about the product and the latent identifiers being stored at s104 along with information about the visually perceivable identifiers 52. The product information associated and stored at s102, s104 may include one or more photographic images of the product, as well as a unique validation code 54 on the label 50 and/or the product.

A manufacturer, distributor, vendor, retailer, etc. applies the label 50 to the associated product in any suitable manner at s106. As non-limiting examples, the label may be adhered or attached to the product or its packaging.

At s108 a consumer considering purchase of the product may verify the authenticity of the product by utilizing a camera-equipped cellular telephone to capture a still or video photographic image of the tag 50 attached to the product. The consumer transmits the image to the remote operator at s110, utilizing system 10 of FIG. 1.

The remote operator receives the photographic image from the consumer and decodes the latent identifier in the image at s112. At s114 the remote operator compares the decoded latent identifiers to the latent identifiers that were previously associated with the product at s102 and stored at s104. The remote operator may also compare the visually perceivable identifiers 52 of label 50 with the visually perceivable identifiers associated with the product at s102 and stored at s104. By comparing the level of correlation and correspondence between the visually perceivable and decoded identifiers of s112 with the associated stored identifiers of s102, s104, the remote operator is able to determine the authenticity status of the item.

The remote operator forwards the authentication results to the consumer at s116. If the decoded latent identifiers of s112 match the stored latent identifiers of s102, the authentication results may include a certificate of authenticity that may be electronically stored by the consumer and/or printed as a record. The authentication results may further include the visually perceivable identifiers 52 of label 50 that were associated with the product at s102 and stored at s104, allowing the consumer to compare them with the visually perceivable identifiers present on the label 50 attached to the product to confirm authenticity. The certificate of authenticity may also include the image associated with the product at s102 and stored at s104.

If the comparison at s114 indicates that either or both of the visually perceivable identifiers 52 and the latent identifiers of label 50 that were forwarded to the remote operator at s110 do not match the visually perceivable identifiers 52 of label 50 that were associated with the product at s102 and stored at s104, the authentication results may include an advisory to the consumer that the authenticity of the product cannot be confirmed, thus placing the consumer on notice that the product may not be genuine. A similar advisory may be issued to the consumer in the event that the label 50 has been tampered with, as the latent identifiers will be altered by the tampering.

The transmission of s116 may optionally include ancillary product-related information from a sponsor or other interested party, such as a manufacturer, distributor or vendor of the product, as well as available accessories for the product. The ancillary product-related information may be, without limitation, original manufacturer data, the geographic location of the facility where the product was made, quality control information, chain of custody tracking and authentication, sale or discount information, product specifications, optional product features, recall information, similar product comparison information, product status (e.g., authentic, not authentic, tampered), manufacturer information, manufacturer worker identification, date/time of manufacture, shipping data, and distribution channels. Additional marketing messages or value-added services may be included in the transmission of s116.

In some embodiments the transmission of s116 may be provided in the primary language of the country of request made at s110. The country of request information is available to the system operator by means of cellular network 16 (FIG. 1), or may be included in the transmission of s110.

At s120 the consumer may compare visually perceivable identifiers received at s118 with visually perceivable identifiers on the label 50 of the product to be purchased. The consumer may also compare the image of s102 with the product to ensure that the image matches the product. If the visually perceivable identifiers 52 on the product label match those provided to the consumer by the remote operator at s118, the product is authentic. If the visually perceivable identifiers 52 on the product label do not match those provided to the consumer by the remote operator at s118, the product may be counterfeit.

If the same visually perceivable identifiers 52 and latent identifiers and presented to the remote operator from different locales and from different camera phones the identifiers may be "taken out of circulation" by the remote operator and flagged as counterfeit with an indication or flag stored at s104 with the identifiers associated with the product at s102. The flag will be retrieved and noted at s114.

Similarly, the visually perceivable identifiers 52 and latent identifiers may also have a predetermined shelf life if used on products having expiration dates, such as fruit, and may expire concurrently with the product. The expiration date is noted by the remote operator and stored at s104 with the identifiers associated with the product at s102. The date will be retrieved and noted at s114, an advisory of the expiration being issued to the consumer at s116.

In some embodiments of the present invention data relating to activity of system 10 relating to product authentication may be collected and stored at s122 for later recall and analysis. Activity data may include, but is not limited to, product inventory, data traffic between the remote operator and consumers relating to the product, vendor verification of the authenticity of inventory, date and time of issuance of authenticity, and the originating cellular network 16 (FIG. 1) utilized by the consumer.

Figure 4:
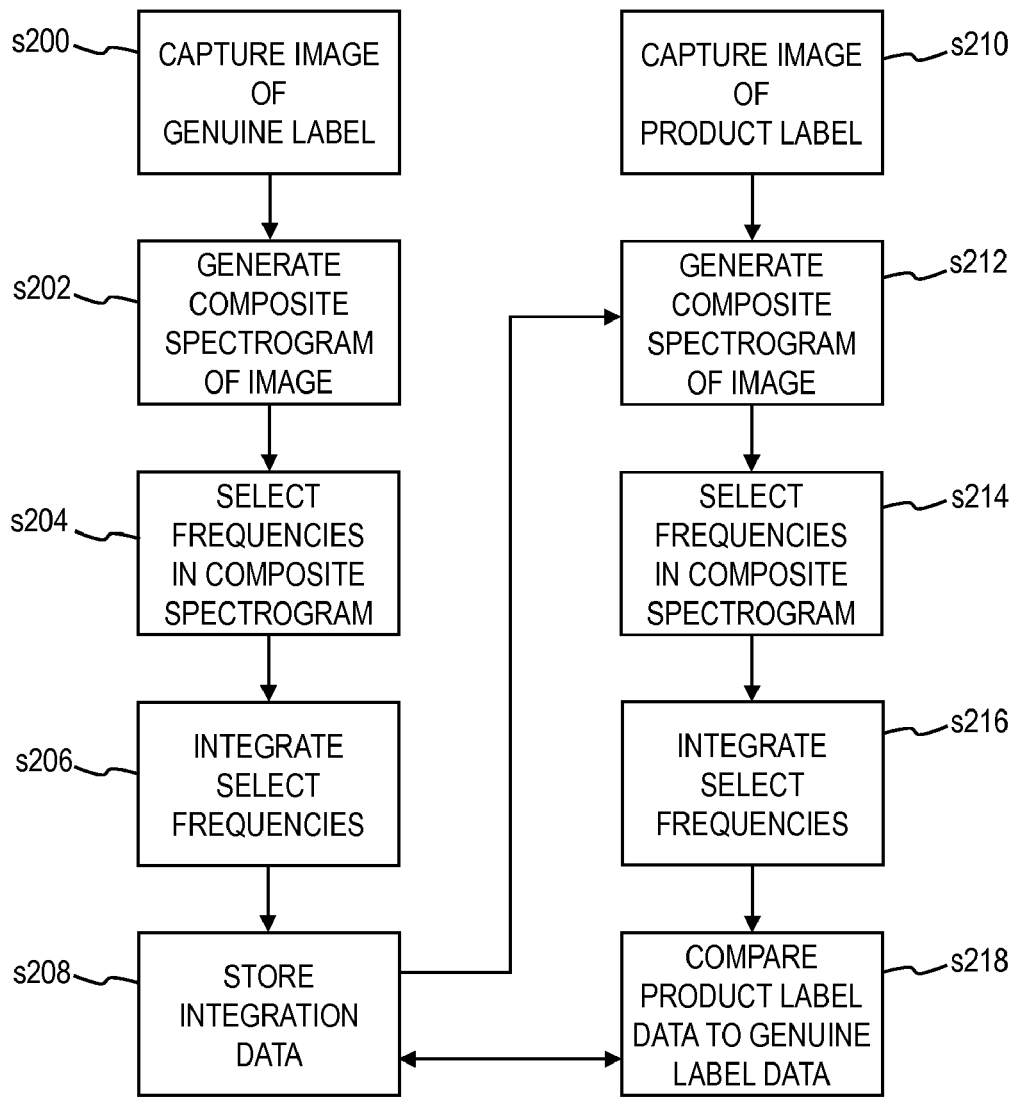
FIG. 4 is a diagram of a process for comparing decoded identifiers with stored identifiers according to an embodiment of the present invention.

Details of a process for generating and detecting latent identifiers for a label 50 are shown in FIG. 4 according to an embodiment of the present invention. At s200 an image of a label 50 (FIG. 3) to be associated with an authentic product is captured and stored.

Figure 5:
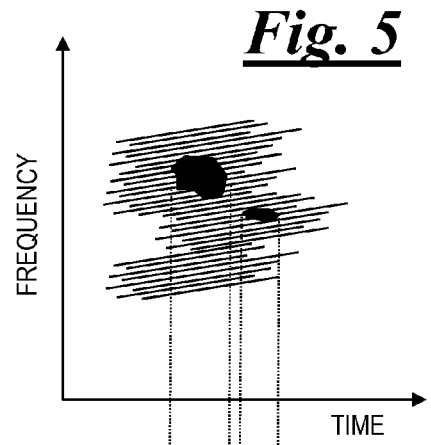
FIG. 5 is a composite spectrogram of an image.

A composite spectrogram of the image of s200 (FIG. 5) is generated at s202 using, for example, a spectrum analyzer to view both time and frequency domains simultaneously. The spectrogram has one axis for the time domain, one axis for the frequency domain, and typically uses color to represent power levels. The composite spectrogram may be of the entire image, of a predetermined portion of the image, or a plurality of predetermined portions of the image.

Figure 6:
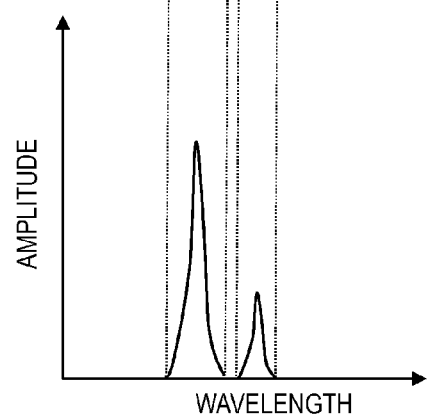
FIG. 6 is a result of integrating frequencies of interest of the composite spectrogram of FIG. 5.

At s204 particular predetermined frequencies of interest of the composite spectrogram data are selected, for select portions of the image, and are integrated at s206 to generate a non-visually perceivable "watermark" of the label 50, the watermark comprising predetermined amplitudes and/or peaks at predetermined frequencies, as shown generally in FIG. 6. The watermark integration data is stored at s208.

The process of s200 through s206 is repeated for an image of a product label, (e.g., s108 of FIG. 2), these process steps being shown in FIG. 3 as corresponding steps s210 through s216. A watermark of the product label results from s216.

At s218 the watermarks of s206 and s216 are compared. If the watermarks meet a predetermined threshold of similarity, the product label of s108 (and the associated product) may be deemed authentic. If the watermarks do not meet the predetermined threshold of similarity, the associated product is likely counterfeit.

In some embodiments the composite spectrogram of s202 may be spectral images in infrared and ultraviolet electromagnetic wavelength ranges that cannot be visually perceived or reproduced. However, the composite spectrogram of s202 is recordable by the cellular telephone camera at s108 (FIG. 2).

With even apparently identical items the composite spectrogram of s202 differs slightly, giving each item a unique "fingerprint" that is not easily visually perceivable. Special, proprietary inks may also be utilized to prevent true-color copying of the image. In some embodiments one or more characters, symbols or graphic elements of label 50 may be uniquely yet subtly varied between labels, such as, for example, graphic 56 in FIG. 3.

Figure 7:
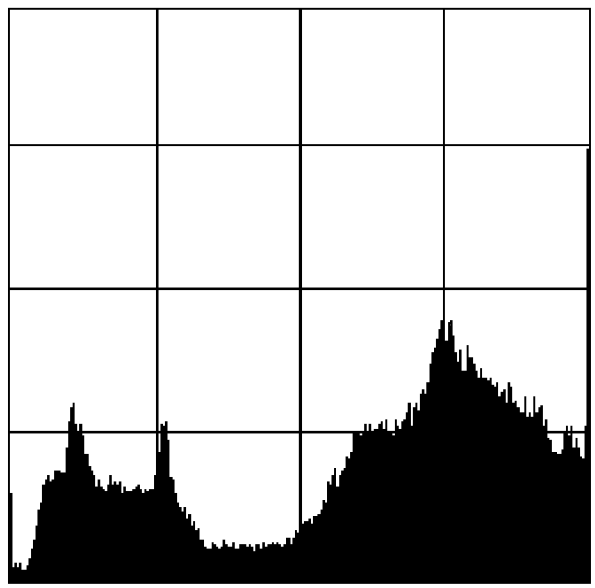
FIG. 7 is a spectrogram of an example first item.
Figure 8:
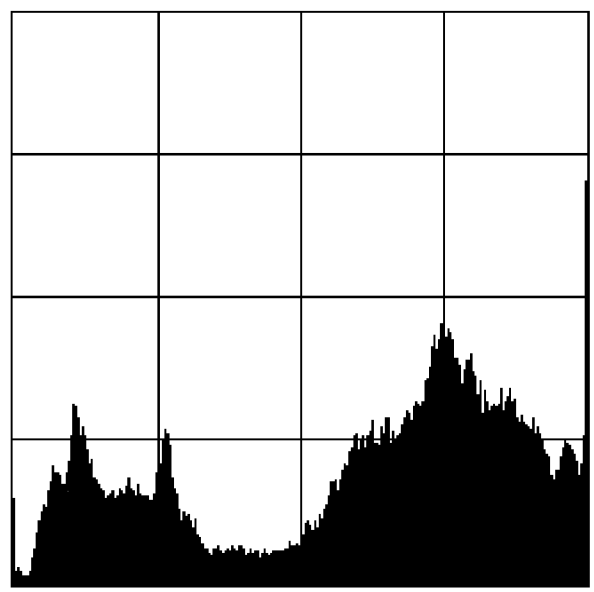
FIG. 8 is a spectrogram of an example second item, the second item being visually similar to the first item of FIG. 7.

Example spectrograms of visually identical items are shown in FIGS. 7 and 8. Although similar, the spectrograms for the items are not identical. Thus, a counterfeit of a label (or the item itself) may be detected through comparison of spectrograms of the authentic label or authentic item with the image of the label or item submitted at s108.

As can be appreciated from the foregoing discussion, the present invention may deter counterfeiting with visually perceivable identifiers 52 and validation code 54 upon labels 50, the visually perceivable identifiers and/or validation code being non-sequential between labels, and each label being uniquely associated with a particular item. Visually perceivable identifiers 52 and validation code 54 are preferably associated with or "synced" one another at s102, s104, forming a unique associated pair. Thus, to print out a sequence of counterfeit labels to apply to counterfeit goods is virtually impossible as one would need to know the entire series of visually perceivable identifiers and validation codes to determine how (or if) the series repeats in order to be able to copy and print them. Even if this were possible, the counterfeit labels would not be usable without knowing what particular authentic items (and/or the source of the items) each authentic label is assigned to, and the counterfeiter would be obliged to attaching a like counterfeit label to a counterfeit item matching that of the item associated with the authentic label. A counterfeiter would also need to know how to access the remote operator (such as knowing the appropriate universal resource locator or URL of the remote operator) in order to decode the labels 50. Taken together, the present invention makes counterfeiting laborious and technically challenging.

Furthermore, when each unique label 50 is assigned to a single unique item, the remote operator may detect at s114 the occurrence of more than one instance of a label, noting for example plural inquiries s110 originating from plural locations (as indicated by location information provided to the remote operator by cellular network 16 in FIG. 1), indicating a possible counterfeit item.

To further deter counterfeiting, the remote operator may track, store and change the status of each label 50. Such status indications may include, without limitation, active, inactive, stolen, counterfeit, missing, altered, and consumed (i.e., item has been sold). The remote operator may change and store the status of each label at s104 for later reference at s114. The impetus for changing the status of each label may be based upon information relating to the label 50 and/or the associated item provided by any or all of the manufacturer, vendor, retailers, consumers, or examination by the remote operator of data stored at s104. If the system operator receives a plurality of counterfeit labels, from a plurality of transmissions s110 from different consumers the system operator is able to determine what labels have been copied and what item(s) the counterfeit label have been attached to. The system operator may update the status of the label 50 accordingly, at s104.

The transmission to the consumer at s116 item may include the visually perceivable validation code 54 previously associated with the item and stored at s102, s104, which the consumer may compare with a like validation code on the label attached to the item (and/or marked on the item itself) to ensure that they are the same, i.e., "in sync." If they do not match, the item may be counterfeit. Similarly, the certificate of authenticity sent at s116 may include one or more of a manufacturer's control code, manufacturing reference or serial number unique to that item and associated at s102, s104, which the consumer may compare with a like manufacturer's control code, manufacturing reference or serial number on the actual item to which the label is attached. If they do not match, the item may be counterfeit. Alternatively, any or all of validation code 54, manufacturer's control code, manufacturing reference or serial number may be read and compared to stored data for the label 50 by the remote operator at s114.

In an alternate non-camera embodiment of the present invention a visually perceivable code 52 is associated with an item and stored at s102, s104. A terminal coupled to a network, such as a computer connected to the internet, or an MMS (multimedia service) or SMS (Short Message Service) for texting, or an email function of a cellular telephone connected to a cellular telephone network, is utilized to manually key in and forward the visually perceivable code to at least one remote server. The remote server generates a dataset as at s114 corresponding to the visually perceivable code and determines the authenticity of the item in the manner previously detailed. The remote server sends at s116 a response from the remote server to the terminal by means of the network, the response comprising information relating to the authenticity of the item.

It will be appreciated that the present invention is not limited to use by consumers. Local, federal and international law enforcement agencies as well as customs agencies may also utilize the system and methods of the present invention to determine the authentication status of products.

While this invention has been shown and described with respect to a detailed embodiment thereof, it will be understood by those skilled in the art that changes in form and detail thereof may be made without departing from the scope of the claims of the invention. For example, although the present invention is described with reference to a camera-equipped cellular telephone, it will be appreciated that the present invention may be implemented with any wired and/or wireless network, including the internet and fax machines, and may be carried out manually or automatically, such as with a computer system within the scope of the invention.

What is claimed is:

1. A method for verifying the authenticity of an item, comprising the steps of:
   recording an image associated with the item with a camera-equipped cellular telephone;
   utilizing a cellular telephone network to forward the recorded image to at least one remote server;
   generating, at the remote server, a dataset corresponding to the image;
   determining, at the remote server, from the dataset, the authenticity of the item;
   sending a response from the remote server to the cellular telephone by means of the cellular network, the response comprising information relating to the authenticity of the item; and
   providing the information relating to the authenticity of the item in the form of a certificate of authenticity, said certificate including a validation code to be compared with a visually perceivable validation code attached to the item.

2. The method of claim 1 wherein the image further includes visually perceivable identifiers, the dataset further including information relating to the visually perceivable identifiers and the item.

3. The method of claim 1 wherein the image further includes latent identifiers, the dataset further including information relating to the latent identifiers and the item.

4. The method of claim 3, further comprising the steps of:
   decoding, at the remote server, the latent identifiers by:
      generating a composite spectrogram of the recorded image,
      selecting a predetermined set of frequencies in the composite spectrogram, and
      integrating the select set of frequencies, the dataset comprising a first watermark corresponding to the integrated set of frequencies; and
   comparing the first watermark to a second watermark representing an authentic item, the dataset including information relating to the results of the comparison.

5. The method of claim 4, further including the step of generating a composite spectrogram of one of the entire recorded image, of a predetermined portion of the recorded image, or a plurality of predetermined portions of the recorded image.

6. The method of claim 4, wherein the composite spectrogram is of an image having at least one of infrared and ultraviolet electromagnetic wavelength ranges.

7. The method of claim 1 wherein the image further includes a validation code, the dataset further including information relating to the validation code and the item.

8. The method of claim 1, further including the step of attaching at least one of a label or a tag attached to the item, the recorded image being that of said label or tag.

9. The method of claim 1 wherein the image is associated with a determinable, unique single unit of particular item.

10. The method of claim 1, further comprising the step of including an image of the item with the certificate of authenticity.

11. The method of claim 1 wherein the response further includes ancillary information relating to the item.

12. The method of claim 1, further comprising the steps of collecting and storing activity data relating to product authentication.

13. The method of claim 1, further comprising the step of providing the response in the primary language of the country from which the recorded image is forwarded to the remote server.

14. The method of claim 1, wherein the response includes an advisory relating to an expiration date for the item.

* * * * *